United States Patent [19]

Rodi

[11] Patent Number: 5,013,981
[45] Date of Patent: May 7, 1991

[54] CONTROL MECHANISM FOR A DRIVE MOTOR OR THE LIKE

[75] Inventor: Anton Rodi, Leimen, Fed. Rep. of Germany

[73] Assignee: Heidelberger Druckmaschinen AG, Heidelberg, Fed. Rep. of Germany

[21] Appl. No.: 355,091

[22] Filed: May 18, 1989

Related U.S. Application Data

[63] Continuation of Ser. No. 934,309, Nov. 24, 1986, abandoned.

[30] Foreign Application Priority Data

Nov. 22, 1985 [DE] Fed. Rep. of Germany ....... 3541277

[51] Int. Cl.$^5$ .............................................. H02P 7/68
[52] U.S. Cl. ........................................ 318/67; 318/34; 318/51; 318/105
[58] Field of Search ............................. 318/53, 59–68, 318/22, 94, 105–108, 262, 278, 301, 305–306, 321, 501, 565, 632, 563, 449, 478–479, 34–39, 51, 69, 71; 364/424.1, 426, 483, 492, 813, 124, 127, 148

[56] References Cited

U.S. PATENT DOCUMENTS

| | | | |
|---|---|---|---|
| 3,781,626 | 12/1973 | Kubo et al. | 318/561 |
| 3,873,816 | 3/1975 | Takeyama et al. | 318/561 |
| 4,268,783 | 5/1981 | Murray | 318/561 |
| 4,284,929 | 8/1981 | Garrett et al. | 318/59 |
| 4,334,175 | 6/1982 | Tanaka et al. | 318/66 |
| 4,378,517 | 3/1983 | Morton et al. | |
| 4,418,381 | 11/1983 | Molusis et al. | 318/561 |
| 4,426,605 | 1/1984 | Steinbrecher . | |
| 4,430,605 | 2/1984 | Arnold | 318/305 |
| 4,473,786 | 9/1984 | Miyashita et al. | 318/561 |
| 4,484,117 | 11/1984 | Bose . | |
| 4,644,232 | 2/1987 | Nojiri et al. | 318/66 |
| 4,792,910 | 12/1988 | Lange . | |

FOREIGN PATENT DOCUMENTS 1209545 10/1970 United Kingdom .
2073665 10/1981 United Kingdom .
2074404 10/1981 United Kingdom .

Primary Examiner—William M. Shoop, Jr.
Assistant Examiner—D. Martin
Attorney, Agent, or Firm—Herbert L. Lerner; Laurence A. Greenberg

[57] ABSTRACT

Control arrangement for an electric motor having a control arrangement which, in accordance with at least one nominal value fed thereto, controls at least one power control element to be connected to an electrical network and the motor, including data transmission apparatus in the form of a computer device for applying to the control arrangement data received by the computer device from at least one of a device for determining the data and a memory wherein the data are stored.

16 Claims, 1 Drawing Sheet

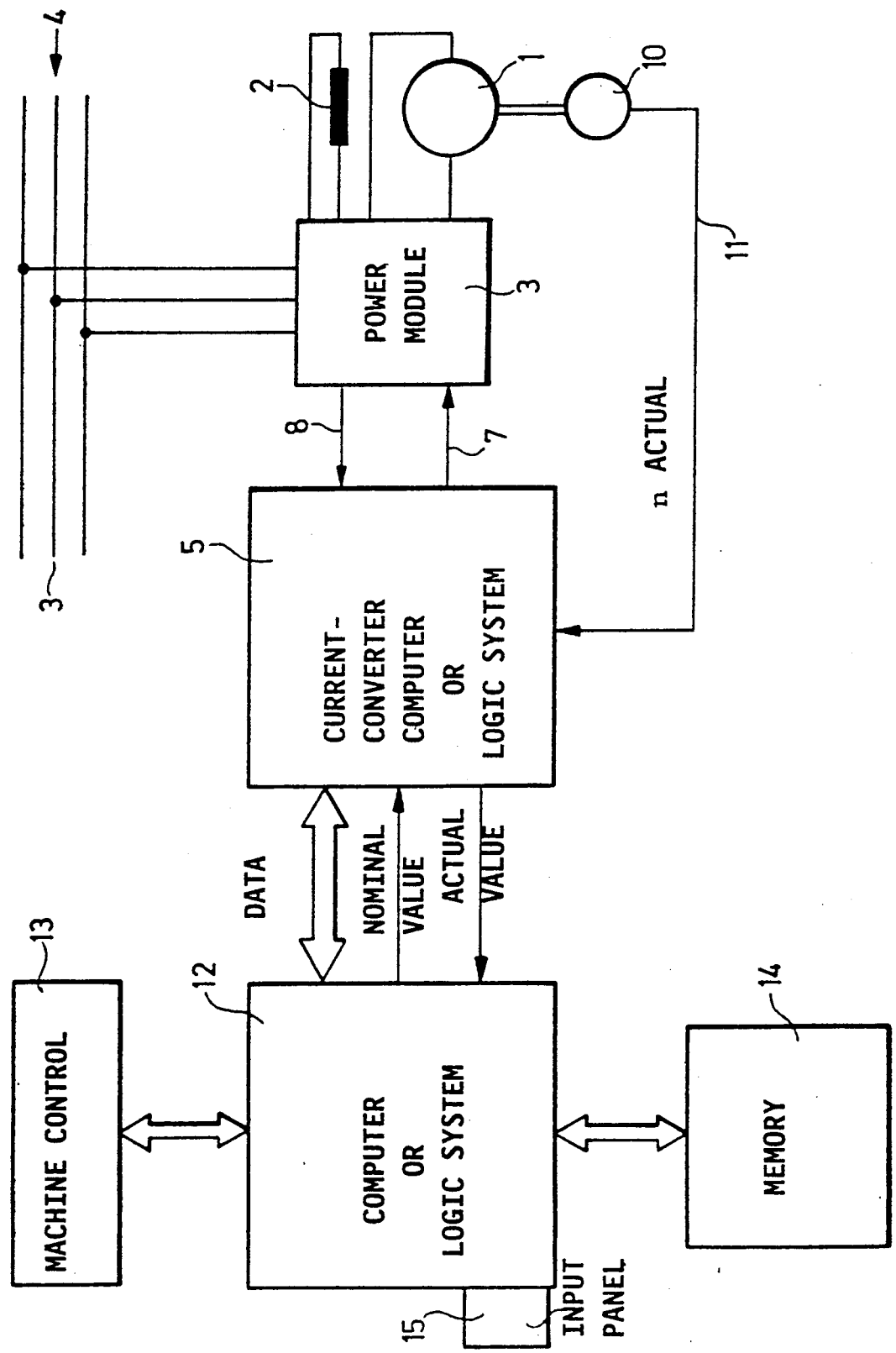

CONTROL MECHANISM FOR A DRIVE MOTOR OR THE LIKE

This application is a continuation of application Ser. No. 934,309 filed Nov. 24, 1986, now abandoned.

The invention is related to a control arrangement for an electric drive motor, such as for a printing machine, the control arrangement controlling, in accordance with at least one nominal value or parameter, such as nominal rotary speed, for example, at least one power control element which is connected to the electrical supply and the motor.

Motors for driving printing machines, in particular larger offset printing machines, are frequently separately or externally excited DC motors fed via controlled rectifiers from a three-phase supply network or, more generally, from an AC supply network.

If, for reasons of simple fabrication and storage, it is necessary to use the same control arrangement in all cases for motors differing in size in accordance with a correspondingly varying size of the machines to be driven, matching or adaptation of the control arrangement to the respective motor is necessary. Through the aforedescribed control system, adjustment of the rotary speed of the motor to the rotary speed prescribed as a set point or as nominal value occurs altogether. Conventional control and adjustment mechanisms have the disadvantage of requiring matching to the respective motor in a costly operation. Qualified specialists are required for the start-up phase. If one wishes to remedy this situation by using specially preset control mechanisms, increased storage requirements, and thus increasing costs, result, due to the large number of different constructions which are necessary.

It is an object of the invention to provide a control arrangement of the aforementioned general type suitable for a number of differing devices or units, e.g. motors, interacting therewith.

With the foregoing and other objects in view, there is provided, in accordance with the invention, a control arrangement assembly for an electric motor having a control arrangement which, in accordance with at least one nominal value fed thereto, controls at least one power control element to be connected to an electrical network and the motor, including data transmission means in the form of a computer device for applying to the control arrangement data received by the computer device from at least one of means for determining the data and a memory wherein the data are stored.

The invention provides for the above-mentioned data to be contained in the memory and/or to be determined and then made effective in the control arrangement, e.g. supplied to an arithmetic logic unit in the current-converter computer device and/or to another computer device. The data which are determined can, for example, be calculated from data contained in the memory. However, it is also possible to obtain such data by measurement, for example by means of temperature measurement, in order to make it possible to match the mode of operation of the drive motor or the like to ambient temperature, for example in order to perform the start-up sequence slowly in the case of a relatively low ambient temperature. At least some of the aforementioned data may be parameter values, e.g. for the drive motor. The memory should preferably be a digital memory, such as a ROM, especially, as is generally known in the technology of electronic logic or computer equipment. The invention ensures that the control arrangement will function in the required manner without requiring potentiometers to be adjusted manually as in the present state of the art. It is useful and advantageous for the control arrangement assembly to contain a digital computer, as is in principle generally familiar in control arrangements of the type under discussion herein.

An advantage of the invention is that, due to the transfer of data to the control arrangement, the latter can be matched or adapted, for example, to the respective motor, so that one and the same control arrangement is suitable for a multitude of motors. Care must be taken only that the necessary data is available, for example, in the memory, from which it can then be transferred to the control arrangement. No costly manual matching procedures are then necessary for start-up.

In accordance with another feature of the invention, the memory is located on the motor and/or on a machine to be driven by the motor, in particular on a printing machine. In order to permit transfer of the data contained in the memory to the control arrangement, in the simplest case, a cable connected to the memory and also containing the necessary measuring lines for monitoring the motor, such as the speed thereof, for example, must be routed to the control arrangement and connected thereto by a suitable connection, such as a plug connection, for example. In this regard, every machine contains the parameter-data necessary for operation of the control arrangement in the form of a memory mounted on the machine, for example in a small sturdy housing. If the motor or the entire printing machine including the motor are exchanged for a different model, no modifications of the control arrangement will be necessary in case of such an exchange.

In accordance with a further feature of the invention, the memory is located in the immediate vicinity of the control arrangement. This may be useful with regard to obtaining especially trouble-free data transfer. Furthermore, in this case, the functionally related electronic components and modules are located not too far apart from one another, which facilitates inspection of the equipment in individual cases. In accordance with an alternate feature of the invention, depending upon the machine to be connected, a special memory is installed, for example, in the control arrangement.

In accordance with an additional feature of the invention, however, the memory contains parameters for several different motors, and means for recognizing the motor connected to the control arrangement and/or the machine driven by the motor are provided, these recognizing means enabling the parameters corresponding to the motor and/or connected machine to be fed to the control arrangement. The aforementioned parameters for the motors under discussion are, for example, rated rotary speed, rated armature voltage, and rated exciter current for a defined load.

If the parameters for all of the motors which can be connected to the control arrangement are contained in the memory, the control arrangement can then be used with all of these motors.

In accordance with an added feature of the invention, the memory additionally contains not only the data or parameters for the various motors, but also parameters for several differing power control elements and means for recognizing the power control element connected to the control arrangement are provided, and enable the parameters corresponding to the connected power control element to be fed to the control arrangement. Such a construction of the invention makes it possible, for example, to use the power control element provided for another machine in the same factory instead of a defective power control element in case of the failure of a power control element installed for a particular machine, it being never quite possible to completely exclude the occurrence of such failure. If the power control element or unit used as a replacement is provided for a smaller motor and is, therefore, of smaller dimensions, the aforementioned construction of the invention will prevent the power control element or unit used as a replacement from being electrically overloaded. The motor can then be operated, but not at full power.

The determined data mentioned at the introduction hereto and which are to be supplied to the control arrangement by the data transmission means can readily be determined from data received by the data transmission means from the control arrangement. This may, for example, be data regarding the temperature of the semiconductor elements contained in the control arrangement, regarding the time rate of change of the torque, or the motor temperature. It may, however, also be data stored in the control arrangement or in power control elements or units connected with the control arrangement and used in the aforedescribed manner in order to prevent overloading of the power control units or elements.

Recognition of the respectively connected motor or of the machine and/or power control element or unit can be technically achieved in the simplest case by making it possible to enter the data regarding the motor (e.g. model type designation) and/or regarding the machine or the power control element or unit via a manually operated data-input device, for example by means of rotary switches or tumbler or toggle switches. In accordance with yet another alternate feature of the invention, which does not even require this simple setting sequence, coded plugs are provided for recognizing the connected motor and/or the machine connected to the motor, the coded plugs being preferably linked with the measuring and/or control lines leading to the motor and/or to the machine. In this manner, the control arrangement is informed regarding the type of connected motor simultaneously with the formation of an electrical connection which is necessary in every case. The coded plug can have coded pins, for example, the presence or absence of which is ascertained by means of limit switches. The construction can also be such that each individual coded plug fits into only one of several sockets, and the type of connected machine connected is notified to the control arrangement in this manner. The connected power control unit or element can be recognized in a similar manner in various constructions of the invention.

In accordance with yet a further feature of the invention, a measuring system for determining at least one characteristic measurement value, e.g. the armature-winding resistance of the motor, for recognition of the motor and/or machine connected to the control arrangement is provided. Automatic recognition of the connected motor or other units can take place provided the electric motors or other units under consideration for connection to the control mechanism differ sufficiently clearly with regard to the selected measurement value.

In accordance with yet an additional feature of the invention, a code scannable via a line, e.g. a short-circuit connection, for recognition of the motor and/or machine connected to the control arrangement is provided.

If the same size of motor is used for driving different machines, it may be necessary to operate the motor in a different manner, for example, at differing rotary speeds according to its use. These data, too, can also be transmitted to the control arrangement by one of the methods detailed above. Differing machines could possibly be detected by purely measuring values accessible on the motor which determine the torque, which is proportional to armature power consumption.

Heretofore, it has been assumed that the data stored in the memory would be transmitted unmodified to the control arrangement. In accordance with another feature of the invention, however, a monitoring system is provided which supplies a modified value to the control mechanism for at least one of the parameters in case of the occurrence of a predetermined operating behavior in the motor or drive (e.g. difficulty of movement, hunting). This can be achieved, for example, in such a way that rotary speed is reduced when the torque to be produced by the motor, while maintaining a prescribed rotary speed, approaches an upper limit value, for example, because the movement of the printing machine becomes difficult due to a drop in ambient temperatures. It can also be advantageous to monitor mains voltage, and to adjust the control of the motor accordingly, in particular in the case of a drop in mains voltage below a prescribed figure.

Due to their manner of production, electric motors have tolerances which cause their speed to fall short of or exceed the rated speed, when two rated variables are applied, for example rated armature voltage and rated exciter current, for a preselected load. In order to attain the rated speed as precisely as possible in such cases without the use of costly adjustment devices in the control arrangement, one embodiment of the invention provides for control of a separately excited DC motor, as frequently used in printing machines, and includes a device for adjusting or setting exciter current on the basis of the data and/or parameters and, where necessary, of the measured values determined in the control arrangement during operation of the motor to such a value that a prescribed operating performance, e.g. a prescribed interaction between rotary speed and armature voltage is achieved and kept constant at this figure. This can, for example, be achieved in such a way that the rated armature voltage and rated exciter current at rated load are set and that the exciter current is modified in such a way in case of deviation in speed from the rated speed until the rated speed is reached. The value for the exciter current determined in this manner is stored, preferably after analog/digital conversion, in a memory of a logic system or computer. If this exciter current is kept constant, rotary speed deviations resulting from temperature fluctuations in the exciter windings can be prevented.

There is also a possibility of detecting deviations in machine parameters from rated values by means of a test run on the part of the manufacturer which are stored in a memory spatially associated with the motor, or in particular firmly attached to the motor. When this motor is then installed, and it becomes necessary, in any case, to route a measuring line to the control arrangement, this measuring line transmitting, for example, the pulses supplied by a tachogenerator, lines contained in the same cable can also be used to supply information contained in the memory regarding the motor tolerances to the control mechanism, and to utilize this data for automatic adjustment of the control arrangement.

In accordance with concomitant feature of the invention, in a similar manner to that provided for the motor there are provided parameters, parameters which are fed also from the rectifier/inverter set in use to the control arrangement, insofar as it is possible to use differing current or power converters. In such a case, the control arrangement will be automatically adjusted to the respective current or converter device without special setting measures or sequences.

Other features which are considered as characteristic for the invention are set forth in the appended claims.

Although the invention is illustrated and described herein as embodied in control arrangement for a drive motor or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing which is a schematic view in the form of a block diagram of a control arrangement for a sheet-fed offset printing press.

Referring now to the drawing, there is shown a separately excited DC motor 1 which, in this case, drives a six-color sheet-fed offset machine. An armature current for the motor 1 and an exciter current fed to a field winding 2 of the motor 1 are supplied from a power module 3 containing non-illustrated controlled rectifiers or thyristors, by means of which electrical energy supplied from a three-phase network 4 is converted to direct current. Ignition pulses for the power module 3 are generated by a current-converter computer unit 5 and routed to the power module 3 via lines 7. The power module 3 contains non-illustrated current measuring and voltage measuring equipment, from which measured data is routed via lines 8 to the current-converter computer unit 5. A tachogenerator 10 connected to the shaft of the motor 1 supplies a characteristic signal for the rotary speed of the motor via a line 11 to the current-converter computer unit 5.

A computer unit 12 coupled to the current-converter computer unit 5 is connected to a machine control unit 13 and a memory 14. The machine control unit 13 is actuated by the printer responsible for the printing machine and is being of conventional construction whereby the printer can, for example, switch on and switch off the printing machine therewith, and can set the speed thereat. Other setting sequences and control sequences which are not directly connected with the drive of the motor, for example, adjustment of the printing machine register, can also be enabled in the machine control unit 13.

A setting or adjustment panel 15, on which an entry as to type for the motor 1 and for the printing machine driven by the motor 1 can be made by means of switches at the installation of the unit, is connected to the computer unit 12. Parameters for all of the motors used for driving the printing machines and for all of the printing machines made by the manufacturer of the unit shown in the figure are stored in the memory 14.

Using the settings made on the input or setting panel 15, the computer unit 12 is capable of selecting those parameters from memory 14 which are characteristic for the specific connected motor 1 and for the printing machine driven by this motor. These parameters encompass, in particular, maximum permissible armature current, maximum permissible armature voltage, exciter current for the field winding 2, permissible rotary speed range of the motor 1 and, where appropriate, other values. The motor 1 in the case of the illustrated embodiment is meant to be a motor having a maximum armature current and a maximum rotary speed which are lower than the corresponding values for another motor supplied by the same manufacturer, and having characteristic parameters which are also stored in the memory 14. The power module 3 must be capable of supplying this other motor, too. The computer unit 12 ensures that, as a maximum, the values permissible for the connected motor 1 are used as set point or nominal values to be fed to the current-converter computer unit 5, even if a higher value, for example for the rotary speed, should have been set for any reason in the machine control unit 13.

If, for example, only two printing units of the six-color printing machine, described by way of example, are in use, the maximum torque required by the machine varies, and this fact is also divulged to the computer unit 12 via the machine control unit 13. If, therefore, as just mentioned hereinabove, only two printing units are in operation, the computer unit 12 ensures that the power-converter computer unit 5 receives a lower value as a maximum possible set point or nominal value for armature current than when all six printing units are in operation.

The division of functions between the current-converter computer unit 5 and the computer unit 12 as provided in the illustrated embodiment can be selected differently or also both of the computer units mentioned can be grouped together to form one single unit.

The invention can be used for the motor or motors for the main drive of a printing machine, but also for other motors on a printing machine, for example in the dampening unit, as well as for motors of other machines.

The foregoing is a description corresponding, in substance, to German application P 35 41 277.1, dated Nov. 22, 1985, International priority of which is being claimed for the instant application, and which is hereby made part of this application. Any material discrepancies between the foregoing specification and the specification of the aforementioned corresponding German application are to be resolved in favor of the latter.

There is claimed:

1. A combination comprising a control arrangement, at least one electric motor connected to a machine which, in accordance with at least one nominal value fed thereto, controls at least one power control element, connected to an electrical network and the electric motor, data transmission means in the form of a computer device for applying to the control arrangement data received by the computer device from a memory wherein the data are stored; wherein said memory has means for containing parameters of a plurality of different motors, and including means for entering the type of the at least one electric motor and the machine, and parameter selecting means for selecting said parameters.

2. The combination according to claim 1, including means for manually entering said data.

3. Control arrangement assembly according to claim 1, including coding plugs by means of which at least one of the connected electric motor and the machine driven by the motor is recognized.

4. Control arrangement assembly according to claim 3, wherein said coding plugs are connected to at least one of measuring lines and control lines leading to at least one of the connected electric motor and the machine driven by the connected electric motor.

5. Control arrangement assembly according to claim 1, including a measuring device for determining at least one characteristic measurement value, means for recognizing from said measurement value at least one of the connected electric motors connected to the control arrangement and the machine driven by the connected electric motor.

6. Control arrangement assembly according to claim 1, including a code system scannable via a line for recognizing at least one of the connected electric motor connected to the control mechanism and the connected machine.

7. Control arrangement assembly according to claim 1, including a monitoring device for feeding to the control mechanism a modified value for at least one of the data values and parameters upon the occurrence of a predetermined operational behavior of the connected electric motor of the control assembly.

8. Control arrangement assembly according to claim 1, for controlling an externally excited DC connected electric motor, comprising means for setting the exciter current to such a value, based upon at least one of the data and parameters and, if necessary, upon measurement values determined in the control arrangement during operation of the connected electric motor, that a prescribed operational behavior exists and is kept constant at this value.

9. Control arrangement assembly according to claim 1, wherein said memory has means for containing therein parameters of said current converter for supplying energy to the connected electric motor, said parameters being evaluatable by the control arrangement.

10. Control arrangement assembly according to claim 1, wherein said memory is a digital memory.

11. Control arrangement assembly according to claim 10, wherein said digital memory is a ROM.

12. A combination comprising a control arrangement, at least one electric motor connected to a machine which, in accordance with at least one nominal value fed thereto, controls at least one power control element connected to an electrical network and said electric motor, data transmission means in the form of a computer device for applying to said control arrangement data received by said computer device from a memory wherein said data are stored; wherein said memory has means for containing parameters of a plurality of different power control elements, and including means for entering the type of said power control element, and parameter selecting means for selecting said parameters.

13. Control arrangement assembly according to claim 12, wherein data regarding the connected power control element is introducible manually via an input device.

14. Control arrangement assembly according to claim 12, including coding plugs by means of which the connected power control element is recognized.

15. Control mechanism assembly according to claim 12, including a measuring device for determining at least one characteristic measurement value so as to recognize the connected power control element.

16. Control arrangement assembly according to claim 12, including a code system scannable via a line for recognizing the connected power control element.

* * * * *